(12) United States Patent
Lin et al.

(10) Patent No.: US 10,651,763 B2
(45) Date of Patent: May 12, 2020

(54) RADIO-FREQUENCY/DIRECT-CURRENT CONVERTER

(71) Applicant: National Chi Nan University, Nantou County (TW)

(72) Inventors: Yo-Sheng Lin, Taichung (TW); Chi-Hung Yeh, Nantou County (TW)

(73) Assignee: National Chi Nan University, Puli Township, Nantou County (TW)

( * ) Notice: Subject to any disclaimer, the term of this patent is extended or adjusted under 35 U.S.C. 154(b) by 143 days.

(21) Appl. No.: 16/018,456

(22) Filed: Jun. 26, 2018

(65) Prior Publication Data
US 2019/0334450 A1  Oct. 31, 2019

(30) Foreign Application Priority Data

Apr. 26, 2018  (TW) .............................. 107114274 A

(51) Int. Cl.
| | |
|---|---|
| *H02M 7/02* | (2006.01) |
| *H02M 7/217* | (2006.01) |
| *H02M 3/07* | (2006.01) |
| *H02J 50/20* | (2016.01) |
| *H02M 7/10* | (2006.01) |
| *H02M 7/219* | (2006.01) |

(52) U.S. Cl.
CPC ............. *H02M 7/217* (2013.01); *H02J 50/20* (2016.02); *H02M 3/07* (2013.01); *H02M 7/02* (2013.01); *H02M 7/103* (2013.01); *H02M 7/219* (2013.01)

(58) Field of Classification Search
CPC .......... H02J 50/20; H02M 7/02; H02M 7/217; H02M 7/219
USPC ......................................... 307/104, 131, 151
See application file for complete search history.

(56) References Cited

U.S. PATENT DOCUMENTS

| | | | |
|---|---|---|---|
| 8,476,955 B2* | 7/2013 | Zierhofer | H02M 7/219 327/330 |
| 2010/0041356 A1* | 2/2010 | Arnborg | H04B 17/327 455/130 |
| 2014/0177305 A1* | 6/2014 | Irish | H02M 7/217 363/127 |
| 2015/0280606 A1* | 10/2015 | Yoshida | H02M 7/217 307/11 |
| 2018/0069486 A1* | 3/2018 | Ouda | H02J 5/00 |

* cited by examiner

*Primary Examiner* — Adi Amrany
(74) *Attorney, Agent, or Firm* — Muncy, Geissler, Olds & Lowe, P.C.

(57) ABSTRACT

A radio-frequency/direct-current (RF/DC) converter is operable to receive a high-frequency and high-power RF signal and convert to a DC power. The RF/DC converter includes a first field-effect transistor (FET), a second FET, a third FET and a sixth FET that are cross-coupled. Sources of the first FET and the second FET are connected to an RF signal receiving end. Sources of the third FET and the fourth FET are connected to a potential reference end. The RF/DC converter further includes a fifth FET and a sixth FET connected subsequently to the first FET, the second FET, the third FET and the fourth.

16 Claims, 7 Drawing Sheets

RADIO-FREQUENCY/DIRECT-CURRENT CONVERTER

FIELD OF THE INVENTION

The present invention relates to a radio-frequency/direct-current (RF/DC) converter, and particularly to an RF/DC converter capable of performing DC conversion on a high-frequency and high-power RF signal in a high-frequency environment.

BACKGROUND OF THE INVENTION

The fundamental architecture of a current wireless power capturing system is as shown in FIG. 1, and primarily includes an antenna 60, a radio-frequency/direct-current (RF/DC) converter 61 connected to the antenna 60, and a power adjustment module 62 connected to the RF/DC converter 61 and performing output. The circuit structure of the RF/DC converter 61 is as disclosed in FIG. 2.

However, in a situation where the RF/DC converter 61 receives a high-frequency and high-power RF signal, the RF/DC converter 61 is deprived from a current rectification function, thus limiting the development of current wireless power capturing systems.

SUMMARY OF THE INVENTION

It is a primary object of the present invention to resolve the issue that a conventional radio-frequency/direct-current (RF/DC) converter is incapable of performing DC power conversion for a high-frequency and high-power RF signal.

To achieve the above object, the present invention provides an RF/DC converter operable to receive a high-frequency and high-power RF signal and convert to a DC power. The RF/DC converter includes an RF signal receiving end, a potential reference end, an output end, a first field-effect transistor (FET), a second FET, a third FET, a fourth FET, a fifth FET and a sixth FET. The first FET includes a first source connected to the RF signal receiving end, a first gate and a first drain. The second FET includes a second source connected to the RF signal receiving end and the first source, a second gate and a second drain. The third FET includes a third source connected to the potential reference end, a third gate connected to the first gate and the second drain, and a third drain connected to the second gate and the first drain. The fourth FET includes a fourth source connected to the potential reference end and the third drain, a fourth gate connected to the first drain, and a fourth drain connected to the first gate. The fifth FET includes a fifth source connected to the output end, a fifth gate connected to the second drain, and a fifth drain connected to the second source. The sixth FET includes a sixth source connected to the output end, a sixth gate connected to the first drain, and a sixth drain connected to the second source.

In one embodiment, the RF/DC converter further includes a seventh FET. The seventh FET includes a seventh source connected to the first source and the second source, a seventh gate connected to the RF signal receiving end, and a seventh drain connected to the seventh gate. Further, the seventh FET is an N-type FET.

In one embodiment, the first FET and the second FET are P-type FETs; the third FET, the fourth FET, the fifth FET and the sixth FET are N-type FETs.

In one embodiment, the RF/DC converter further includes an eighth FET, a ninth FET, a first capacitor, a second capacitor and a resistor. The eight FET includes an eighth source connected to the fifth source and the sixth source, an eighth gate connected to the potential reference end, and an eighth drain connected to the first capacitor. The ninth FET includes a ninth source connected to the fifth source and the sixth source, a ninth gate connected to the potential reference end, and a ninth drain connected to the second capacitor. One end of the first capacitor that is not connected to the eighth drain is connected to the potential reference end. One end of the second capacitor that is not connected to the ninth drain is connected to the potential reference end. The resistor is connected in parallel to the first capacitor. The output end is connected to one end of the resistor that is not connected to the potential reference end.

In one embodiment, the RF/DC converter further includes a third capacitor connected in parallel to the second capacitor.

In one embodiment, the frequency of the RF signal is higher than 13.56 MHz.

With the above disclosure of the present invention, the present invention provides following features compared to the prior art. When receiving the high-frequency and high-power RF signal, the RF/DC converter disclosed by the present invention is still capable of performing conversion and outputting a DC power having a smaller ripple rate and provides better power conversion efficiency, thereby enhancing wireless charging efficiency and eliminating an operating frequency limitation for wireless charging.

DETAILED DESCRIPTION OF THE PREFERRED EMBODIMENTS

Details and technical contents of the present invention are given with the accompanying drawings below.

Figure 3:
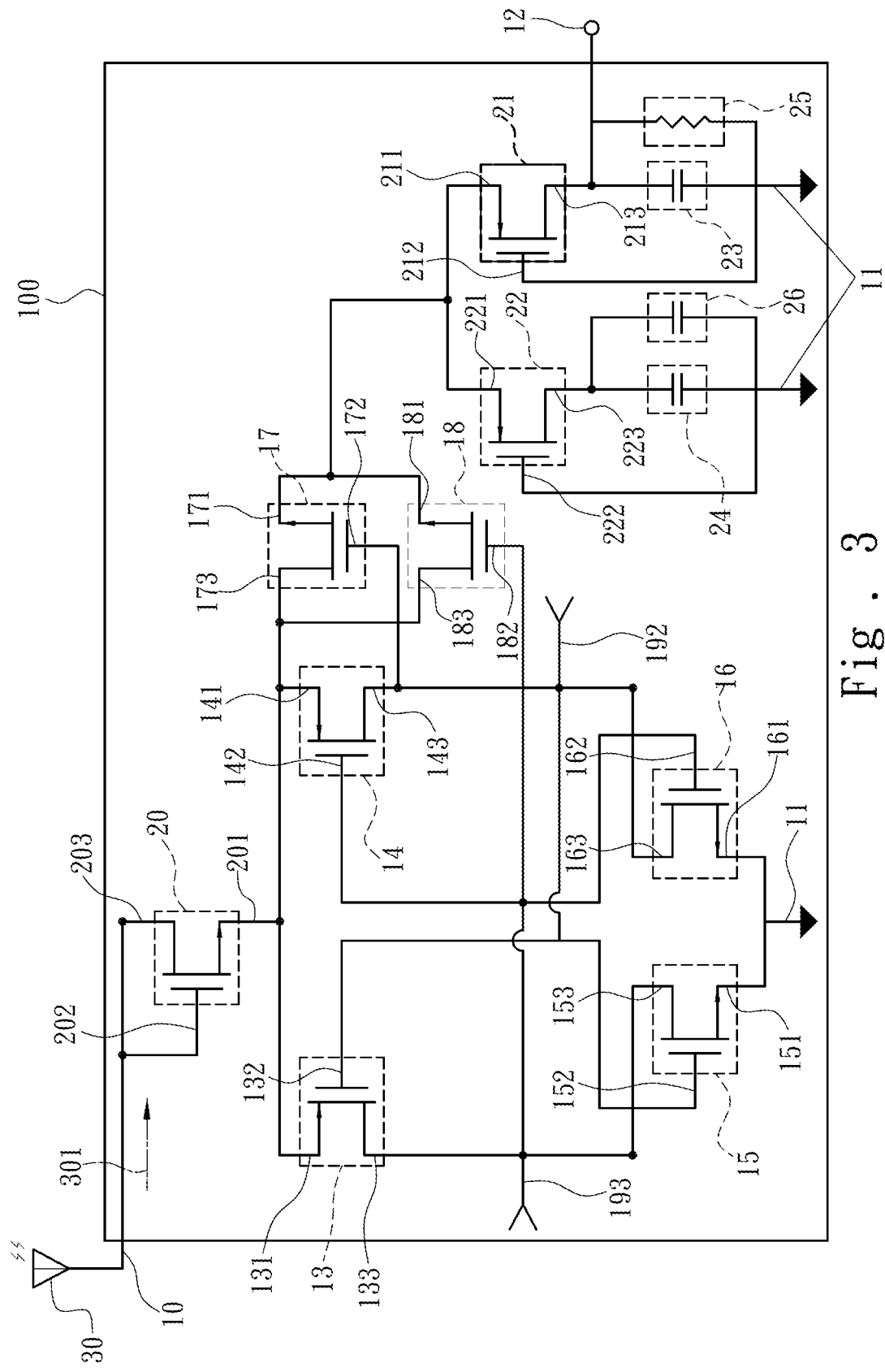
FIG. 3 is a circuit schematic diagram according to an embodiment of the present invention.

Referring to FIG. 3, the present invention provides a radio-frequency/direct-current (RF/DC) converter 100 for capturing wireless energy; further, the RF/DC converter 100 may be used in a wireless charging module. The RF/DC converter 100 includes an RF signal receiving end 10, a potential reference end 11, an output end 12, a first field-effect transistor (FET) 13, a second FET 14, a third FET 15, a fourth FET 16, a fifth FET 17 and a sixth FET 18. Further, the RF signal receiving end 10 is connected to an antenna 30, so as to receive an RF signal 301 via the antenna 30. The RF signal 301 is high-frequency and high-power. The term "high-frequency" refers to a frequency higher than 13.56 MHz, and the term "high-power" refers to that the power of the RF signal reaches 0.1 W. The potential reference end 11 may be directly or indirectly grounded according to circuit characteristic requirements; that is to say, the potential reference end 11 is not necessarily at zero potential during implementation. The output end 12 is connected to a load to power the load. The first FET 13 includes a first source 131 connected to the RF signal receiving end 10, a first gate 132 and a first drain 133. The second FET 14 includes a second source 141 connected to the RF signal receiving end 10 and the first source 131, a second gate 142 and a second drain 143. The third FET 15 includes a third source 151 connected to the potential reference end 11, a third gate 152 connected to the first gate 132 and the second drain 143, and a third drain 153 connected to the second gate 142 and the first drain 133. The fourth FET 16 includes a fourth source 161 connected to the potential reference end 11 and the third drain 153, a fourth gate 162 connected to the first drain 133, and a fourth drain 163 connected to the first gate 132. The fifth FET 17 includes a fifth source 171 connected to the output end 12, a fifth gate 172 connected to the second drain 143, and a fifth drain 173 connected to the second source 141. The sixth FET 18 includes a sixth source 181 connected to the output end 12, a sixth gate 182 connected to the first drain 133, and a sixth drain 183 connected to the second source 141. In one embodiment, the first FET 13 and the second FET 14 are P-type FETs; the third FET 15, the fourth FET 16, the fifth FET 17 and the sixth FET 18 are N-type FETs.

Figure 4:
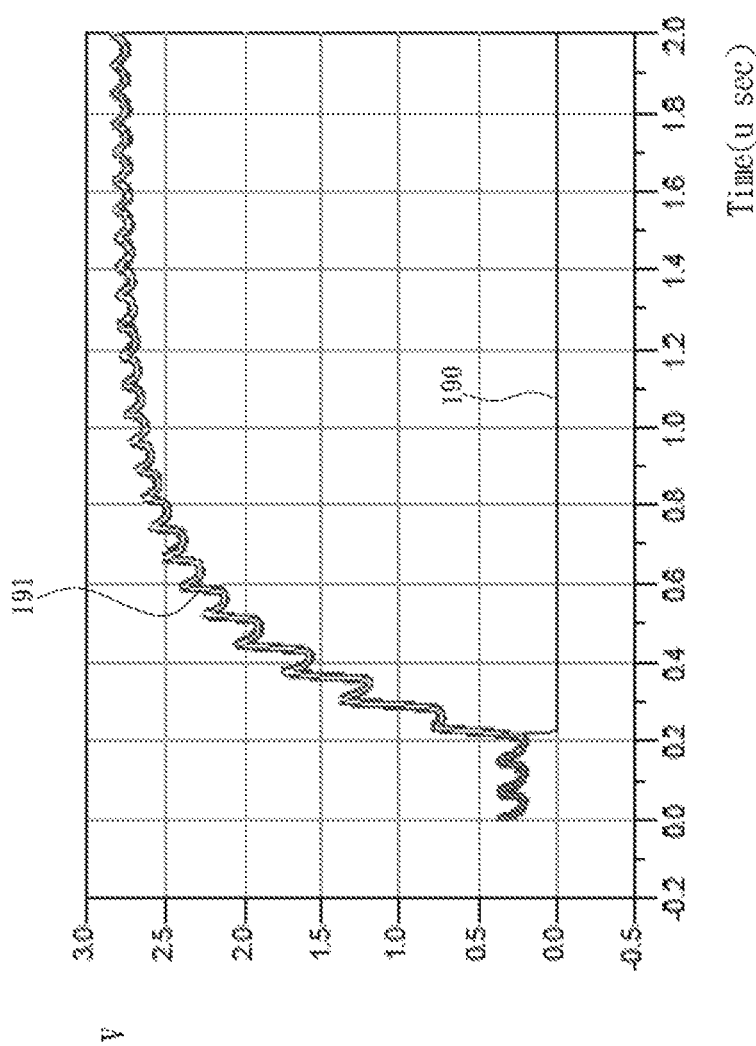
FIG. 4 is a waveform diagram at measuring points 192 and 193 in FIG. 3 when an RF signal is 13.56 MHz.
Figure 5:
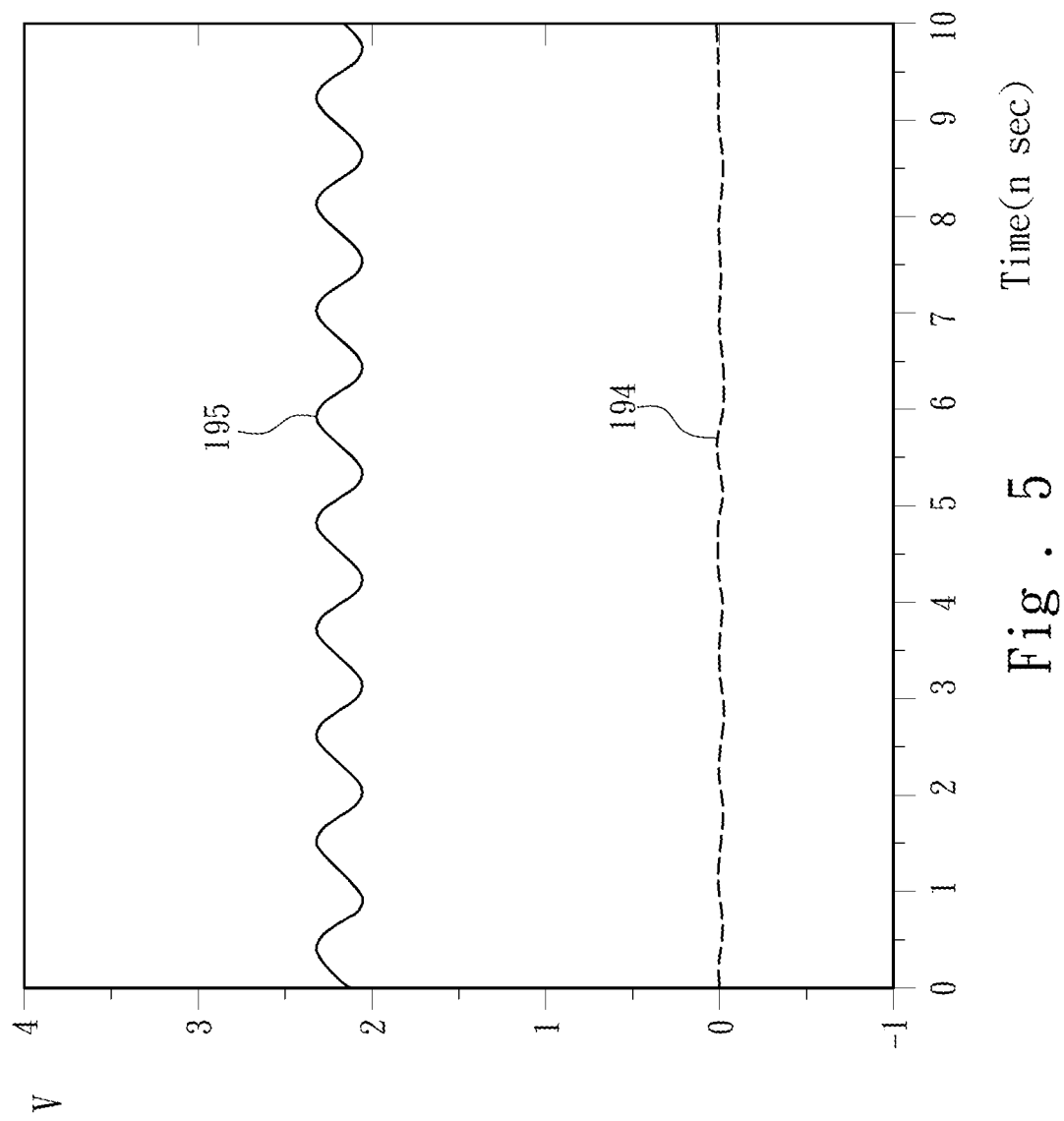
FIG. 5 is a stable-state waveform diagram at measuring points 192 and 193 in FIG. 3 when an RF signal is 0.9 GHz.

In the present invention, the first FET 13, the second FET 14, the third FET 15 and the fourth FET 16 are configured as cross-coupled to provide a latch function. The first FET 13, the second FET 14, the third FET 15 and the fourth FET 16 control conduction or cutting off of the fifth FET 17 or the sixth FET 18. After the RF/DC converter 100 has reached a stable state, only one of the fifth FET 17 and the sixth FET 18 is conducted in response to current overall circuit characteristics. Referring to FIG. 4, a waveform 190 in FIG. 4 indicates a waveform of electrical power transmitted to the fifth FET 17, and is obtained from a measuring point 192 depicted in FIG. 3; the other waveform 191 is a waveform of electrical power transmitted to the sixth FET 18 is obtained from a measuring point 193 depicted in FIG. 3. It is known from the waveform 190 that, after a short oscillation in an initial period after activation, the waveform 190 subsequently drops to zero potential immediately. That is to say, after the present invention has reached a stable state, the fifth gate 172 of the fifth FET 17 does not receive sufficient electrical power for forming a channel and becomes cut-off. Further, the frequency of the experimentation example shown in FIG. 4 is 13.56 MHz. In addition, simulation is further carried out for an RF signal having a frequency of 0.9 GHz as shown in FIG. 5. Referring to FIG. 5, a waveform 194 is obtained from the measuring point 192 depicted in FIG. 3, and the other waveform 195 is obtained from the measuring point 193 depicted in FIG. 3.

Further, oscillation also occurs in the waveform 191 during an initial period after activation. However, voltage gradually rises due to overall circuit characteristics such that the sixth gate 182 of the sixth FET 18 receives sufficient electrical power to form a channel, thus conducting the sixth FET 18. Further, in the present invention, the turn-on resistance values of the fifth FET 17 and the sixth FET 18 are designed to be extremely small, in a way that power conversion efficiency (PCE) is effectively enhanced. Moreover, the fifth FET 17 and the sixth FET 18 further cause time-varying characteristics of electrical power transmitted to the output end 12 to be closer to a constant value, that is, the ripple rate of electrical power transmitted to the output end 12 is reduced such that the electrical power better approximates a direct current.

Again referring to FIG. 3, in one embodiment, the RF/DC converter 100 further includes a seventh FET 20. The seventh FET 20 includes a seventh source 201 connected to the first source 131 and the second source 141, a seventh gate 202 connected to the RF signal receiving end 10, and a seventh drain 203 connected to the seventh gate 202. Further, the seventh gate 202 of the seventh FET 20 is connected to the seventh drain 203, such that a threshold voltage of the seventh FET 20 approximates zero, and the seventh FET 20 is accordingly allowed to perform more ideal half-wave rectification on the RF signal from the RF signal receiving end 10. Thus, the electrical power outputted from the seventh drain 203 has a higher potential and a lower ripple rate, i.e., less loss, which helps enhance the power conversion efficiency. Further, the seventh FET 20 may be an N-type FET.

Again referring to FIG. 3, to further reduce the ripple rate of electrical power outputted from the output end 12, in one embodiment of the present invention, the RF/DC converter 100 further includes an eighth FET 21, a ninth FET 22, a first capacitor 23, a second capacitor 24 and a resistor 25. The eighth FET 21 includes an eighth source 211 connected to the fifth source 171 and the sixth source 181, an eighth gate 212 connected to the potential reference end 11, and an eighth drain 213 connected to the first capacitor 23. The ninth FET 22 includes a ninth source 221 connected to the fifth source 171 and the sixth source 181, a ninth gate 222 connected to the potential reference end 11, and a ninth drain 223 connected to the second capacitor 24. One end of the first capacitor 23 that is not connected to the eighth drain 213 is connected to the potential reference end 11. One end of the second capacitor 24 that is not connected to the ninth drain 223 is connected to the potential reference end 11. The resistor 25 is connected in parallel to the first capacitor 23. The output end 12 is connected to one end of the resistor 25 that is not connected to the potential reference end 11. At this point, the eighth FET 21, the ninth FET 22, the first capacitor 23, the second capacitor 24 and the resistor 25 form a low-pass filter, which performs low-pass filtering on the electrical power outputted from the fifth FET 17 or the sixth FET 18, thereby reducing the ripple rate of the electrical power outputted via the output end 12 of the present invention. Further, to prevent the converted DC power from drastic changes in response to a change in the impedance of the load connected to the output end 12, in one embodiment, the RF/DC converter 100 further includes a third capacitor 26, which is connected in parallel to the second capacitor 24 and has a capacitance value of 1 nF.

Figure 1:
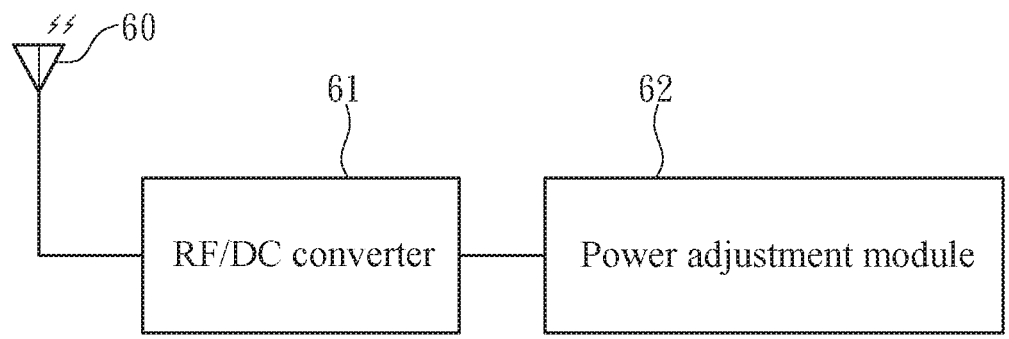
FIG. 1 is a unit composition diagram of a conventional wireless power capturing system.
Figure 2:
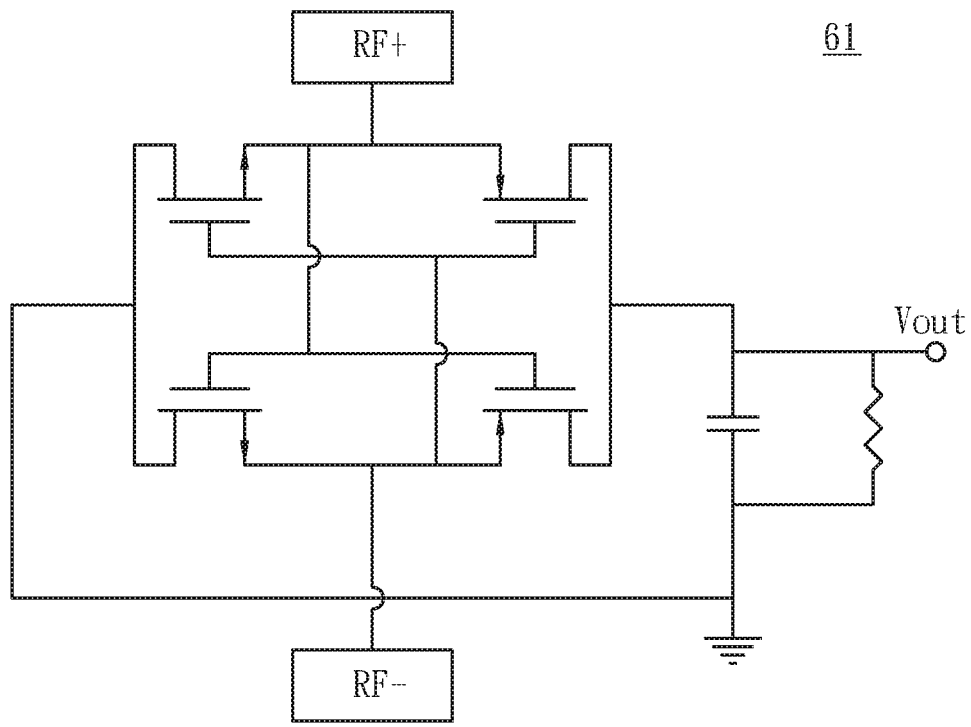
FIG. 2 is a circuit diagram of a conventional radio-frequency/direct-current (RF/DC) converter.
Figure 6:
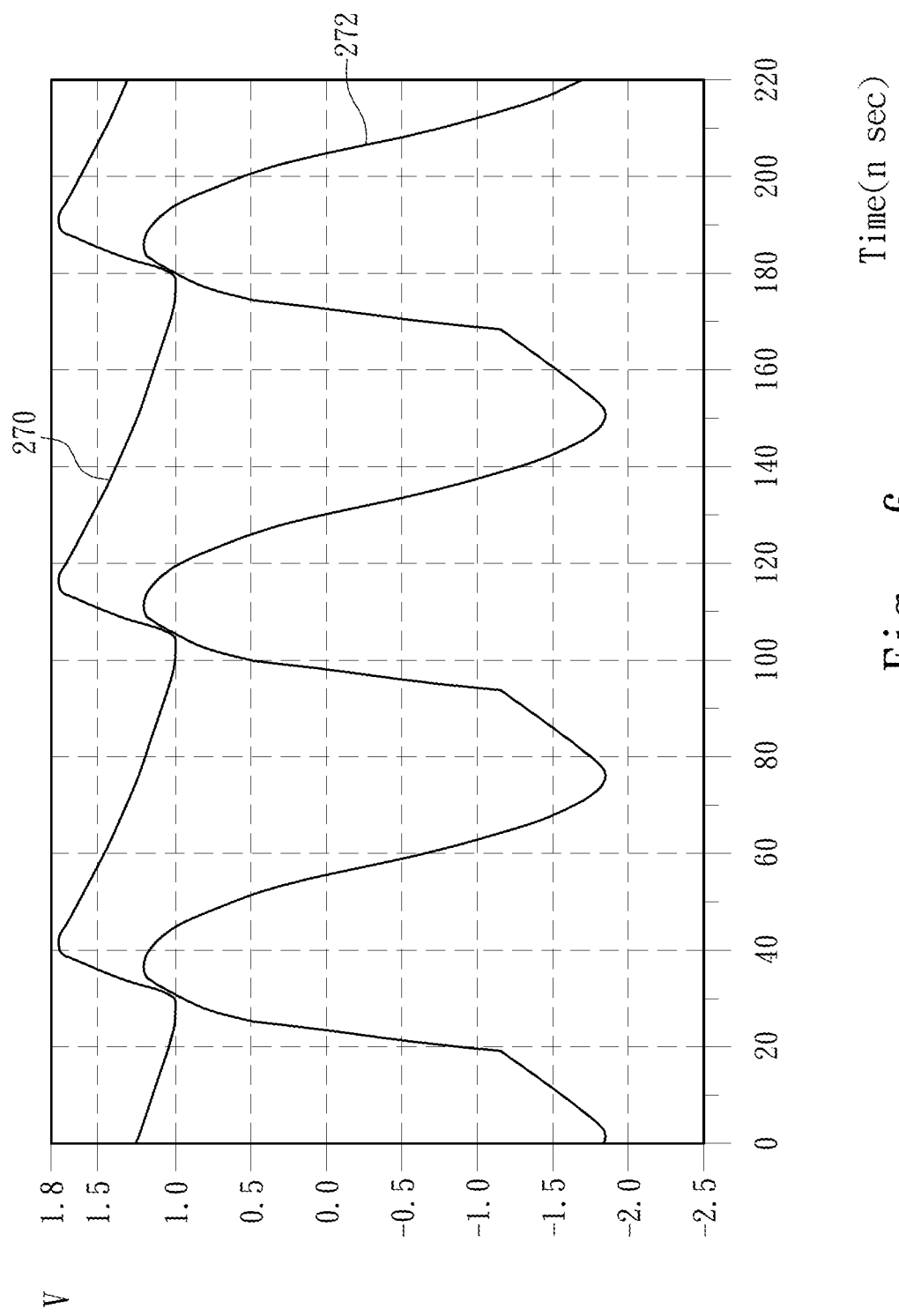
FIG. 6 is a comparison diagram of stable output waveforms when an RF signal is 13.56 MHz in the present invention and the prior art.
Figure 7:
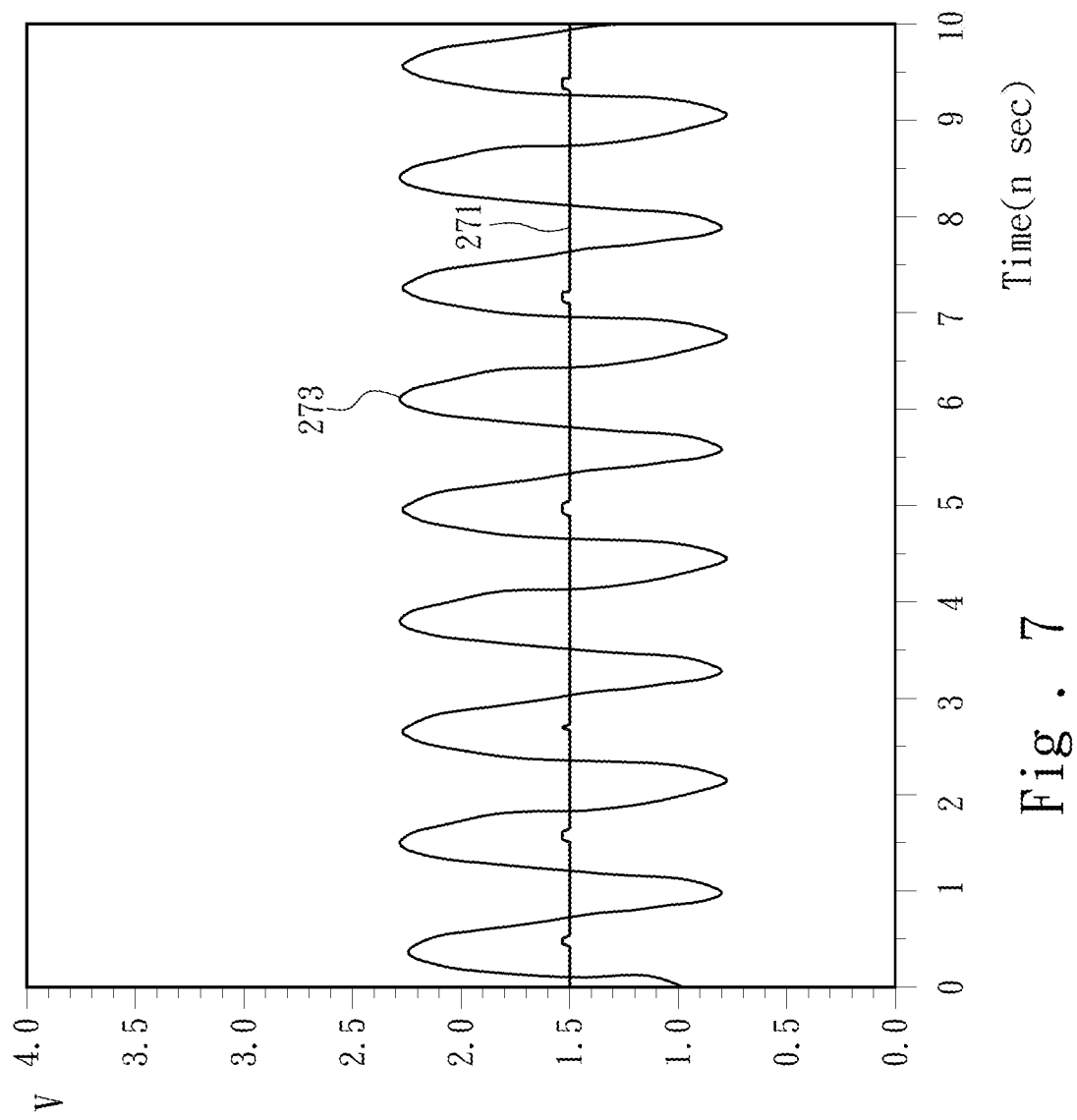
FIG. 7 is a comparison diagram of stable output waveforms when an RF signal is 0.9 GHz in the present invention and the prior art.

In continuation, conversion capabilities of the present invention and a conventional circuit (i.e., that disclosed in FIG. 1) are compared by taking an example where the RF signal is 13.56 MHz and 0.9 GHz. The comparison results are as shown in FIGS. 6 and 7, wherein FIG. 6 shows simulation conditions of 13.56 MHz, and FIG. 7 shows simulation conditions of 0.9 GHz. It is seen from the disclosure of the two drawings that, the output waveforms of the RF/DC converter 100 in a stable state are as shown by waveforms denoted as 270 and 271, and waveforms outputted by a conventional circuit in a stable state are waveforms denoted as 272 and 273 in the drawings. It is clearly observed that, the present invention is capable of performing conversion and outputting a DC power having a smaller ripple rate in a high-frequency environment; in contrast, although having alternating properties, electrical power outputted by the conventional circuit cannot operate normally in such environment.

Figure 8:
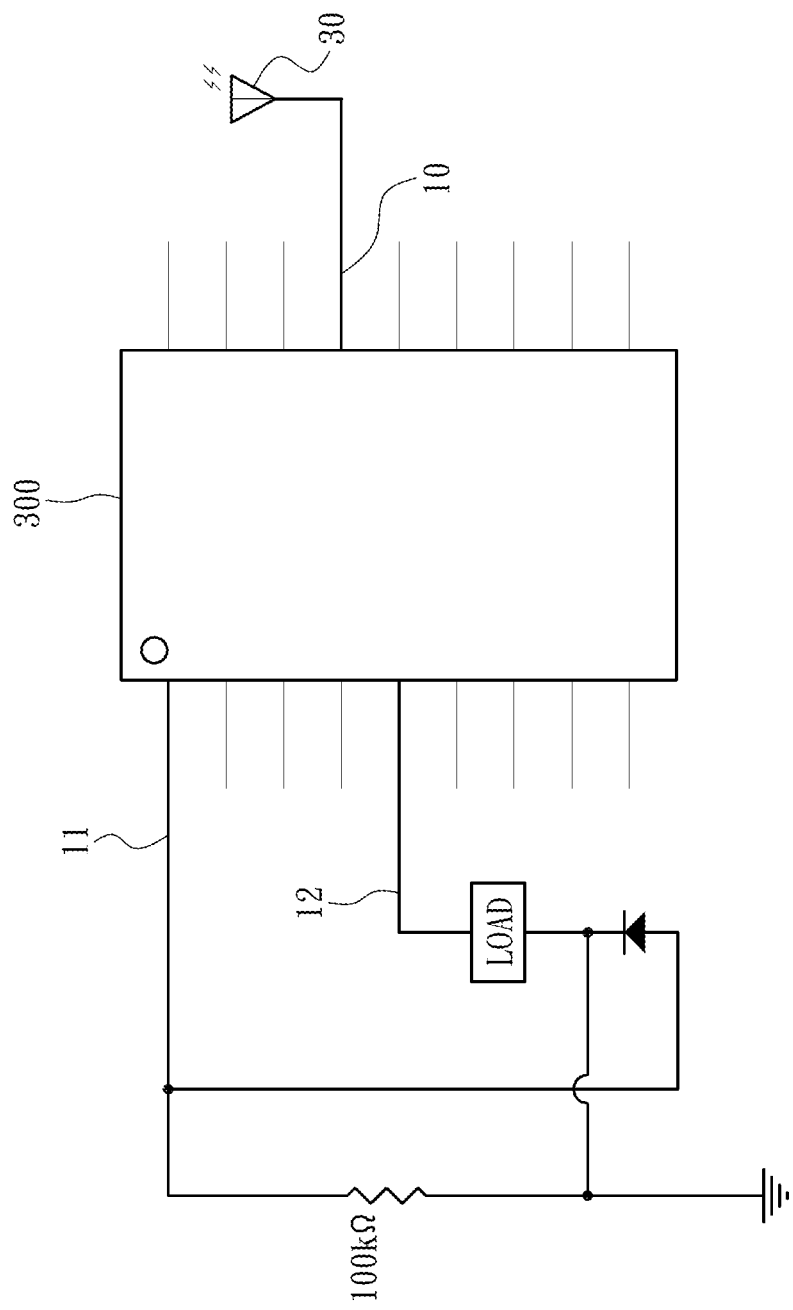
FIG. 8 is a unit schematic diagram according to an embodiment of the present invention.

Referring to FIG. 8, the RF/DC converter 100 of the present invention can be implemented by a plurality of electronic components based on the disclosure of the application, or be implemented by integrated circuits via integrated circuit designs based on the disclosure of the application. When the RF/DC converter 100 is implemented by an independent integrated circuit, the RF/DC converter 100 may be independently packaged as a chip 300, which in one embodiment has an implementation circuit as disclosed in FIG. 6. In addition, the RF/DC converter 100 of the present invention is not limited to independent implementation, and may also be implemented in coordination with other circuits or modules.

What is claimed is:

1. A radio-frequency/direct-current (RF/DC) converter, operable to receive a high-frequency and high-power RF signal and convert to a DC power, the RF/DC converter comprising:
   an RF signal receiving end;
   a potential reference end;
   an output end;
   a first field-effect transistor (FET), comprising a first source connected to the RF signal receiving end, a first gate and a first drain;
   a second FET, comprising a second source connected to the RF signal receiving end, a second gate and a second drain;
   a third FET, comprising a third source connected to the potential reference end, a third gate connected to the first gate and the second drain, and a third drain connected to the second gate and the first drain;
   a fourth FET, comprising a fourth source connected to the potential reference end and the third drain, a fourth gate connected to the first drain, and a fourth drain connected to the first gate;
   a fifth FET, comprising a fifth source connected to the output end, a fifth gate connected to the second drain, and a fifth drain connected to the second source; and
   a sixth FET, comprising a sixth source connected to the output end, a sixth gate connected to the first drain, and a sixth drain connected to the second source.

2. The RF/DC converter of claim 1, further comprising a seventh FET, wherein the seventh FET comprises a seventh source connected to the first source and the second source, a seventh gate connected to the RF signal receiving end, and a seventh drain connected to the seventh gate.

3. The RF/DC converter of claim 2, wherein the seventh FET is an N-type FET.

4. The RF/DC converter of claim 3, wherein the first FET and the second FET are P-type FETs, and the third FET, the fourth FET, the fifth FET and the sixth FET are N-type FETs.

5. The RF/DC converter of claim 3, further comprising an eighth FET, a ninth FET, a first capacitor, a second capacitor and a resistor; the eighth FET comprises an eighth source connected to the fifth source and the sixth source, an eighth gate connected to the potential reference end, and an eighth drain connected to the first capacitor; the ninth FET comprises a ninth source connected to the fifth source and the sixth source, a ninth gate connected to the potential reference end, and a ninth drain connected to the second capacitor; one end of the first capacitor that is not connected to the eighth drain is connected to the potential reference end; one end of the second capacitor that is not connected to the ninth drain is connected to the potential reference end; the resistor is connected in parallel to the first capacitor; and the output end is connected to one end of the resistor that is not connected to the potential reference end.

6. The RF/DC converter of claim 3, wherein a frequency of the RF signal is higher than 13.65 MHz.

7. The RF/DC converter of claim 2, wherein the first FET and the second FET are P-type FETs, and the third FET, the fourth FET, the fifth FET and the sixth FET are N-type FETs.

8. The RF/DC converter of claim 7, further comprising a third capacitor connected in parallel to the second capacitor.

9. The RF/DC converter of claim 2, further comprising an eighth FET, a ninth FET, a first capacitor, a second capacitor and a resistor; the eighth FET comprises an eighth source connected to the fifth source and the sixth source, an eighth gate connected to the potential reference end, and an eighth drain connected to the first capacitor; the ninth FET comprises a ninth source connected to the fifth source and the sixth source, a ninth gate connected to the potential reference end, and a ninth drain connected to the second capacitor; one end of the first capacitor that is not connected to the eighth drain is connected to the potential reference end; one end of the second capacitor that is not connected to the ninth drain is connected to the potential reference end; the resistor is connected in parallel to the first capacitor; and the output end is connected to one end of the resistor that is not connected to the potential reference end.

10. The RF/DC converter of claim 2, wherein a frequency of the RF signal is higher than 13.65 MHz.

11. The RF/DC converter of claim 1, wherein the first FET and the second FET are P-type FETs, and the third FET, the fourth FET, the fifth FET and the sixth FET are N-type FETs.

12. The RF/DC converter of claim 11, further comprising an eighth FET, a ninth FET, a first capacitor, a second capacitor and a resistor; the eighth FET comprises an eighth source connected to the fifth source and the sixth source, an eighth gate connected to the potential reference end, and an eighth drain connected to the first capacitor; the ninth FET comprises a ninth source connected to the fifth source and the sixth source, a ninth gate connected to the potential reference end, and a ninth drain connected to the second capacitor; one end of the first capacitor that is not connected to the eighth drain is connected to the potential reference end; one end of the second capacitor that is not connected to the ninth drain is connected to the potential reference end; the resistor is connected in parallel to the first capacitor; and the output end is connected to one end of the resistor that is not connected to the potential reference end.

13. The RF/DC converter of claim 12, further comprising a third capacitor connected in parallel to the second capacitor.

14. The RF/DC converter of claim 12, wherein a frequency of the RF signal is higher than 13.65 MHz.

15. The RF/DC converter of claim 1, further comprising an eighth FET, a ninth FET, a first capacitor, a second capacitor and a resistor; the eighth FET comprises an eighth source connected to the fifth source and the sixth source, an eighth gate connected to the potential reference end, and an eighth drain connected to the first capacitor; the ninth FET comprises a ninth source connected to the fifth source and the sixth source, a ninth gate connected to the potential reference end, and a ninth drain connected to the second capacitor; one end of the first capacitor that is not connected to the eighth drain is connected to the potential reference end; one end of the second capacitor that is not connected to the ninth drain is connected to the potential reference end; the resistor is connected in parallel to the first capacitor; and the output end is connected to one end of the resistor that is not connected to the potential reference end.

16. The RF/DC converter of claim 1, wherein a frequency of the RF signal is higher than 13.65 MHz.

* * * * *